June 17, 1930.  F. M. HOLADAY  1,763,785
STEERING APPARATUS FOR AUTOMOBILES
Filed Aug. 10, 1925
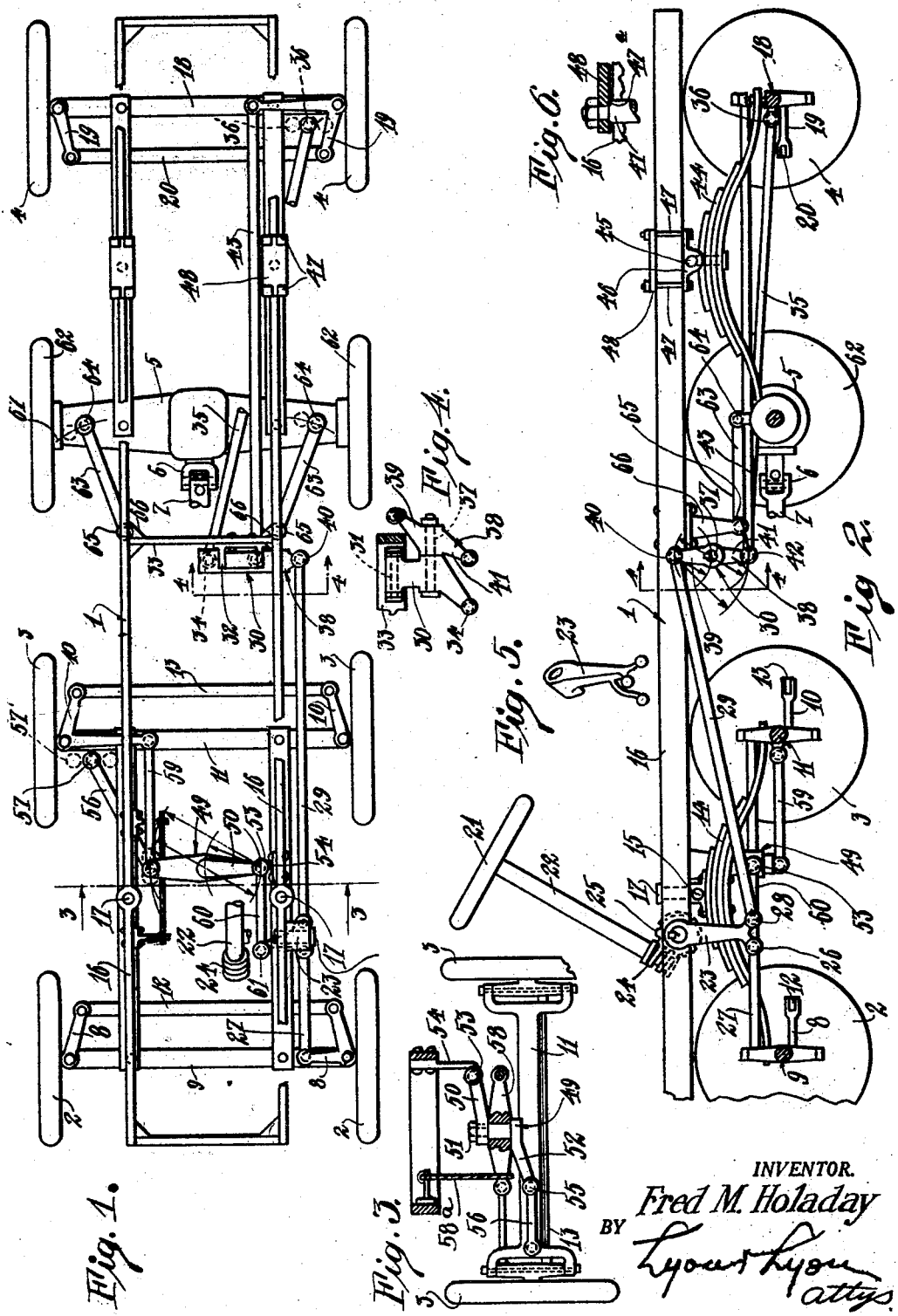
INVENTOR.
Fred M. Holaday
BY Patented June 17, 1930

1,763,785

UNITED STATES PATENT OFFICE

FRED M. HOLADAY, OF VIRGINIA PLACE TRACT, CALIFORNIA

STEERING APPARATUS FOR AUTOMOBILES

Application filed August 10, 1925. Serial No. 49,288.

This invention relates to steering gear for automobiles, and while the invention may be employed for steering an automobile of any kind, it is intended to be especially useful as applied to the steering gears of automobile trucks. With the increased use of automobile trucks for transporting heavy loads on highways, it has become advisable to limit the load on the wheels, and this calls for truck designs carrying an increased number of wheels. Trucks with 6 wheels or of 8 wheels on the same frame, are to be employed. Where the wheels maintain a fixed axial relation on their axles, it is found that where slight lateral displacements of the axle take place there is a very considerable wear occasioned on the tires on account of the fact that the wheel is not rotating in a plane parallel with the longitudinal axis of the truck. This occasions an increased expense in operation. It also increases the gasoline consumption per mile. Trucks of six or eight wheels are, of course, relatively long, and it is not practicable to steer them merely by steering the front wheels as is usual in pleasure cars. It has been found, however, that where steering knuckles are used on rear axles when a displacement of the rear axle occurs longitudinally of the frame, this displacement occasions a relative movement in the steering mechanism and produces an undesired steering effect in the rear wheels.

The general object of this invention is to provide a steering gear for an automobile which will meet these difficulties and which is so constructed that the steering gear will compensate itself automatically as it were to movements of a rear axle carrying wheels which are steered from the forward end of the automobile; also to provide an automobile with a steering gear in which any axle such as the driving axle will be automatically brought back into its mid-position or neutral position if it should become displaced laterally.

Further objects of the invention will appear hereinafter.

The invention consists in the novel parts and combination of parts to be described hereinafter, all of which contribute to produce an efficient steering apparatus for automobiles.

A preferred embodiment of the invention is described in the following specification, while the broad scope of the invention is pointed out in the appended claims.

In the drawing:

Fig. 1 is a plan of an automobile chassis with certain parts broken away, and illustrating an embodiment of my steering gear.

Fig. 2 is a side elevation of the chassis and steering gear shown in Fig. 1, certain parts being broken away and others shown in section; the wheels are shown diagrammatically.

Fig. 3 is a section through the frame taken about on the line 3—3 of Fig. 1, certain parts being broken away; this view illustrates features of my invention which enable the steering mechanism to compensate for displacements in a rear axle.

Fig. 4 is a vertical section taken about on the line 4—4 of Fig. 1 and illustrating a feature of my invention which enables the steering gear to compensate for displacements of the rearmost axle.

Fig. 5 is a perspective of a steering arm which is actuated by the steering wheel and which imparts movement to the forward steered wheels and to the rear steered wheels.

Fig. 6 is a vertical section in detail illustrating a construction which permits the springs that support the rear wheels of the truck to shift back and forth on the frame.

In practicing my invention, I provide an axle carrying wheels which support the frame or a part of the frame on springs. I also provide a steering wheel of any common construction which is supported on the frame; steering knuckles are associated with the wheels. I provide a connection between the steering wheel and the steering knuckles for moving the knuckles in steering, and in this connection I provide means for compensating for the change of the relative position of the axle when the springs are flexed.

Although my invention may be applied to a six wheeled truck or a four wheeled truck, in the present specification I have described it as applied to an eight wheeled truck.

In the drawing 1 represents a truck frame, with a pair of forward wheels 2 and a pair of intermediate wheels 3, all of which may be steered. In addition to this the rearmost pair of wheels 4 may be steered, and forward of these wheels 4 I provide an axle housing 5 for the driving axle which carries a differential of usual construction which may be driven through a universal joint 6 from the shaft 7 which extends forwardly and is driven from the motor of the truck. The forward wheels 2 are carried on forward steering-knuckles 8 attached to a forward axle 9, and the wheels 3 are carried on similar steering knuckles 10 on an intermediate rear axle 11. The forward steering knuckles 8 are connected by a tie rod 12 and a similar tie rod 13 connects the rear knuckles 10. The axles 9 and 11 support the springs 14 which have a horizontal pivot 15 on a block which seats on the under side of each side bar 16 of the frame 1, and each block is provided with a king-pin 17 mounted to rotate in the frame bar.

The wheels 4 are carried on the rearmost axle 18 by means of rear steering knuckles 19 that are connected by a tie rod 20.

In order to steer the automobile I provide a steering wheel 21 of any suitable construction, the steering column 22 of which operates to move a steering arm 23. Any suitable means may be provided for imparting the movement from the steering column to this arm, for example, the worm 24 and worm-wheel 25. This arm 23 is preferably of special construction, see Figure 5. On its outer side it is provided with a connection 26 which may be a ball-and-socket, to a link 27 which extends forwardly and attaches to the steering knuckle 8. Near the connection 26 a similar connection 28 is provided which attaches this arm to means such as a link 29 which extends rearwardly on the truck. This link forms part of the means for imparting steering movement to the rear knuckles 19. This means or mechanism also includes a lever or a similar part mounted upon a floating support or floating lever, that is to say, I provide this lever with a fulcrum mounted on a floating support, and I control the position of the floating support from the axle 18. In order to accomplish this I prefer to provide a construction such as that shown in Figure 4, in which the floating support 30 is in the form of a short lever supported on a horizontal pin 31 in a bracket 32 attached to a cross bar 33 of the frame. The attachment is made in such a way that this floating support or lever 30 will swing in a substantially vertical plane and in a front and rear direction on the frame. At another point, for example, at the lower end of this lever I provide a connection 34 which connects it to a radius rod 35 which extends rearwardly in an inclined direction and is attached at its rear end by a connection 36 to the rear axle 18. These connections 34 and 36 are preferably ball-and-socket connections.

At about the middle point of this floating support or lever 30 I provide a bolt or fulcrum pin 37 for a lever 38 having an upper arm 39 which has a joint 40 connecting it with the rear end of the link 29 referred to above. The lower arm 41 of this lever is attached by a connection 42 to a link 43 which extends rearwardly and connects to the steering knuckle 19 on the adjacent side of the truck.

The two axles 5 and 18 support springs 44 similar to the springs 14, and the middle portions of these springs have pivotal connections 45 respectively, which connect them to a bracket or plug 46 on the under side of the adjacent side bar of the frame. Each block 46 has a sliding connection with the frame, and in the present instance I effect this connection by providing bolts 47 at each side of the block and at each end of it, the upper ends of these bolts passing through a saddle plate or clip 48 which rests on shoulders 47ª on these bolts (see Fig. 6) and rides on the upper side of the frame bar.

With this mounting for the axle 18 it will be evident that if the springs 44 are flexed, a rearward displacement will occur in the axle 18 with respect to the frame. When such a rearward displacement occurs the radius-rod 35 operates to effect a rearward swinging movement of the floating support 30. This effects a rearward movement of the lever 38 and thereby produces a compensation in the steering mechanism; in other words when the axle 18 moves rearwardly the link 43 also moves rearwardly and prevents imparting any undesired steering movement to the rear steering knuckles 19.

I provide a somewhat similar floating support in connection with the steering mechanism for operating the intermediate steering knuckles 10. In order to accomplish this I provide a floating support 49, see Figures 1 and 3, which may be in the form of a lever arm 50 keyed to a stub-shaft 51 which carries a lower arm 52. The upper arm 50 is provided with a connection 53 to a bracket 54 supported on the adjacent side bar of the frame. At another point, preferably at the remote end of the arm 52 I provide a connection 55 to a radius rod 56. This radius rod extends rearwardly in an inclined direction and is provided with a connection 57 at its rear end which connects it to one end of the intermediate axle 11.

This stub shaft 51 operates as the fulcrum point for a lever 58 which constitutes part of the mechanism for imparting the movement from the steering arm 23 to the knuckles 10. In other words one end of the lever 58 is attached by a link 59 to the steering knuckle 10 on the right hand side of the frame and the other end of the lever 58 is attached by a link 60 to the arm 23. I prefer to provide a ball-and-socket connection 61 between the link 60 and the arm 23 and the connections for the radius rod are also preferably ball-and-socket connections.

With the construction just described it will be evident that if the springs 14 are flexed, a rearward displacement of the axle 11 relative to the frame will occur. When this takes place the radius-rod 56 will operate as a link producing a rearward movement of the floating support 49, thereby producing a rearward displacement of the fulcrum pin or shaft 51 which is the fulcrum for the lever 58. In this way the lever 58 will be given a rearward movement corresponding to the rearward displacement of the axle 11 and this will produce a compensation in the steering mechanism which will avoid giving an undesired steering movement to the knuckles 10.

In order to steer the driving wheels 62 and the axle housing 5 back into line in case the axle 5 should be displaced laterally in moving along a roadway, I provide two radius-rods 63 which are mounted to move in a substantially horizontal plane. These radius-rods are attached at their rear ends by ball-and-socket connections 64 to the upper side of the housing 5, and at their forward ends they are attached by ball-and-socket connections 65 to brackets 66 fixed respectively on the side bars of the frame 1. These radius-rods preferably converge in a forward direction. With such radius-rods holding the axle 5, it will be evident that if the axle 5 shifts toward the right, for example, the axis of the connection 64 will move along an arc 67 struck about the center of the connection 65. This will move the right hand side of the axle housing 5 forwardly and evidently the left hand side of the axle will move in a similar arc but in a general rearward direction. This will produce a relatively great angular displacement or orientation of the axle housing 5 which will immediately exert a steering effect tending to place the wheels 62 in their normal neutral position under the truck. In other words the action of the radius-rods 63 is to constantly correct any tendency of the wheel 62 to track out of place. The use of these radius-rods, keeping the driving wheels in their proper driving position, greatly reduces the amount of wear on the tires of these wheels and in addition to this it saves power for driving the automobile by keeping the driving wheel 62 in a front-and-rear plane.

The radius-rods or links 35 and 56 perform a function similar to this function performed by the radius rods 63, in connection with their own corresponding axles 18 and 11. This correcting effect of these latter radius-rods will be evident from the following considerations.

Supposing for example that the intermediate axle 11 should shift toward the right so that the connection 57 will move to the point 57'. If this occurred, a pull would be developed in the radius rod 56 which would produce a rearward movement in the link 59. This would produce a "left" steering effect in the knuckles 10, which would immediately bring the wheels 3 back into their proper tracking plane. In a similar way, if the rearmost axle 18 should shift for example, toward the right, so that the connection 36 moved to the point 36', then a thrust would occur in the radius-rod 35. This thrust would produce a forward movement of the floating support 30, thereby developing a pull in the link 43. This would swing the steering knuckle 19 toward the left and put the wheels 4 in position to bring them back immediately into their proper tracking plane. Obviously my steering mechanism can be applied to a six wheel truck or a ten wheel truck.

It is understood that the embodiment of the invention described herein is only one of the many embodiments this invention may take, and I do not wish to be limited in the practice of the invention, nor in the claims, to the particular embodiment set forth.

The lever 58 is supported with free movement at the end opposite the bracket 54, by means of a sling 58ª in the form of a cable supported on the frame 1.

What I claim is:—

1. In a steering-gear for an automobile, the combination of a frame, axles with springs supporting the frame, wheels carried by the axles and including a pair of wheels having steering knuckles, a steering-wheel mounted on the frame, mechanism connecting the steering wheel with said steering knuckles for steering the automobile, said mechanism including a lever through which the movement is imparted from the steering wheel to the knuckles, and a floating support for the lever, with means for controlling the floating support to shift the fulcrum of the lever when the axle carrying the steering knuckles shifts its relative position with respect to the frame of the automobile.

2. In a steering-gear for an automobile, the combination of a frame, a front axle, wheels with steering knuckles supporting the front axle, a rear axle, a spring between the rear axle and the frame, operating when the spring is deflected to effect a relative displacement of the rear axle rearwardly on the frame, wheels supporting the rear axle and having steering knuckles, a steering-wheel connected with the forward steering knuckles for steering the front wheels, a floating lever disposed transversely of the frame supported at one point on the frame, a link connected with the floating lever at another point and connecting the same with the rear axle, mechanism connecting the steering wheel with the steering knuckles of the rear axle and including a lever having its fulcrum on the said floating lever, whereby, when a deflection of the spring occurs, the said link effects a rearward movement of the fulcrum of the last named lever, thereby compensating the steering mechanism to the rearward displacement of the rear axle.

3. In a steering gear for an automobile, the combination of a frame, a forward axle with wheels and steering knuckles carrying the wheels, a rear axle with rear wheels and rear steering knuckles carrying the wheels, a spring supporting the frame on the rear axle and operating when flexed to effect a rearward displacement of the rear axle, a steering-wheel for the automobile, means connecting the same with the forward steering knuckles for steering the front wheels, a floating lever extending transversely of the frame in a substantially horizontal plane supported at one end of the frame, a radius rod connecting the other end of the floating lever with the rear axle and operating to effect a rearward movement of the floating lever when the spring is flexed so as to displace the rear axle, and means connecting the steering wheel with the rear steering knuckles including a lever having its fulcrum located on the floating lever whereby a rearward displacement of the rear axle moves the fulcrum of the last named lever rearwardly and compensates for the displaced position of the rear axle.

4. In a steering gear for an automobile, the combination of a frame, a forward axle with forward wheels and steering knuckles carrying the same on the forward axle, a rear axle, rear wheels and rear steering knuckles carrying the rear wheels on the rear axle, a floating support attached at one point on the frame and operating to swing in a substantially vertical plane and in a front and rear direction on the frame, a steering wheel, mechanism connecting the steering wheel with the rear steering knuckles and including a lever having its fulcrum on the floating support, and a radius rod connected with the rear axle and connected with the floating support whereby the displacement of the rear axle in a rearward direction effects a rearward movement in the floating support and thereby compensates the steering mechanism to the said displacement of the rear axle.

5. In a steering gear for an automobile, the combination of a frame, a rear axle with rear steering knuckles and wheels carried by the knuckles, an axle housing forward of the said rear axle for carrying the differential and driving axle with driving wheels for the automobile, radius-rods connecting the driving axle with the frame, a steering wheel, a floating support pivotally supported on the frame at one point, a radius-rod connecting the floating support at another point with the said rear axle, and mechanism for connecting the steering wheel with the rear steering knuckles including a lever having its fulcrum on the said floating support, said last named radius rod operating upon a rearward displacement of the said rear axle to effect a rearward movement of the floating support and thereby compensate the steering mechanism to the displaced position of the said rear axle.

6. In a steering gear for an automobile, the combination of a frame, a forward axle with forward wheels and steering knuckles carrying the same, an axle-housing with driving wheels for carrying the differential and the driving axle of the automobile, radius-rods connecting the axle housing with the frame, a floating support pivotally mounted on the frame at one point and having a radius-rod extending rearwardly therefrom, a rear axle connected to the radius-rod and connected with the frame rearward of the said axle-housing and carrying steering knuckles with wheels, means connected with the steering wheel for moving the forward steering knuckles, and means connecting the steering wheel with the rear steering knuckles including a lever mounted on the said floating support, said last named radius-rod operating upon a rearward displacement of the rear axle to effect a rearward movement of the floating support and thereby compensate the steering mechanism to a displaced position of the said rear axle.

7. In a steering gear for an automobile, the combination of a frame, a pair of springs supporting the frame and having a sliding connection with the same, an axle housing attached to the forward portion of the springs for carrying the driving axle of the automobile with its wheels, radius-rods movable in a substantially horizontal plane connecting the axle-housing with the frame, a rear axle attached to the rear ends of the springs, rear steering knuckles and wheels carried thereby, a floating support pivotally mounted on the frame, a radius-rod connecting the floating support with the rear axle, a steering wheel for the automobile, and means connecting the steering wheel with the steering knuckles including a lever having its fulcrum on the said floating support, said last named radius-rod operating upon a rearward displacement of the rear axle, to produce a rearward movement of the floating support and thereby compensate the steering mechanism to different positions of the rear axle.

8. In a steering gear for an automobile, the combination of a frame, forward steering axles with wheels, an axle-housing for carrying the differential driving axle and driving wheels, radius-rods movable in a substantially horizontal plane connecting the axle housing with the frame, a rear axle disposed rearwardly of the axle-housing, rear steering knuckles with wheels carried thereby, a floating support pivotally mounted on the frame to swing in a substantially vertical plane, a radius-rod connecting the floating support with the said rear axle, a steering wheel, means connecting the same with the rear steering knuckles including a lever having its fulcrum on the floating support, springs connecting the rear axle and the axle-housing with the frame, an intermediate axle between the forward wheels and the axle housing, steering knuckles and wheels carried thereby, a floating support pivotally supported on the frame at one point, a radius-rod connecting the last named floating support at another point with the said intermediate axle, mechanism connecting the steering wheel with the last named steering knuckles and including a lever having its fulcrum on the last named fulcrum support, the radius-rods which connect to the intermediate axle and the rear axle operating to compensate the steering mechanism to displaced positions of the corresponding axles.

Signed at Los Angeles, California, this 1st day of August, 1925.

FRED M. HOLADAY.